United States Patent [19]

Schloss

[11] 4,027,405
[45] June 7, 1977

[54] RECORD-REPRODUCE DEVICE FOR FLASH CARDS

[76] Inventor: Alden Schloss, P.O. Box 4862, North Hollywood, Calif. 91607

[22] Filed: Jan. 26, 1976

[21] Appl. No.: 652,091

[52] U.S. Cl. .................................. 35/35 C; 360/2; 360/101

[51] Int. Cl.² ..................... G09B 5/04; G11B 21/02; G11B 25/04

[58] Field of Search ................. 35/35 C; 360/2, 101

[56] References Cited

UNITED STATES PATENTS

| | | | |
|---|---|---|---|
| 2,603,006 | 7/1952 | MacChesney et al. | 35/35 C |
| 2,677,200 | 5/1954 | MacChesney | 35/35 C |
| 2,849,542 | 8/1958 | MacChesney | 35/35 C X |
| 3,255,537 | 6/1966 | Cole et al. | 35/35 C |
| 3,289,326 | 12/1966 | Bender | 35/35 C |
| 3,307,274 | 3/1967 | Glaser | 35/35 C |
| 3,412,483 | 11/1968 | Jacobs | 35/35 C |
| 3,488,867 | 1/1970 | Lyon et al. | 35/35 C |
| 3,628,257 | 12/1971 | Budrose | 35/35 C UX |
| 3,800,315 | 3/1974 | Budrose | 35/35 C X |

Primary Examiner—William H. Grieb

[57] ABSTRACT

A device having a slot in which removable-insertable flash cards or flexible tape are placed. On the face of the cards or flexible tape are placed, singly or in any combination, braille letters, braille words, printed matter and pictures. On the same face of the cards or flexible tape are placed lengthwise strips of magnetic tape, flexibly held to facilitate maximum utilization of the wavelength "reading" ability of a magnetic head. In alignment with the magnetic tape on an inserted card or flexible tape is a record-reproduce magnetic head. The cards and flexible tape are disposed horizontally in the preferred embodiment to facilitae learning braille. Said head is mechanically driven with uniform and reciprocal motion over the length of magnetic tape, on rods. Amplifier and control means allow the same head to record potential audio messages and also to reproduce said audio messages.

7 Claims, 13 Drawing Figures

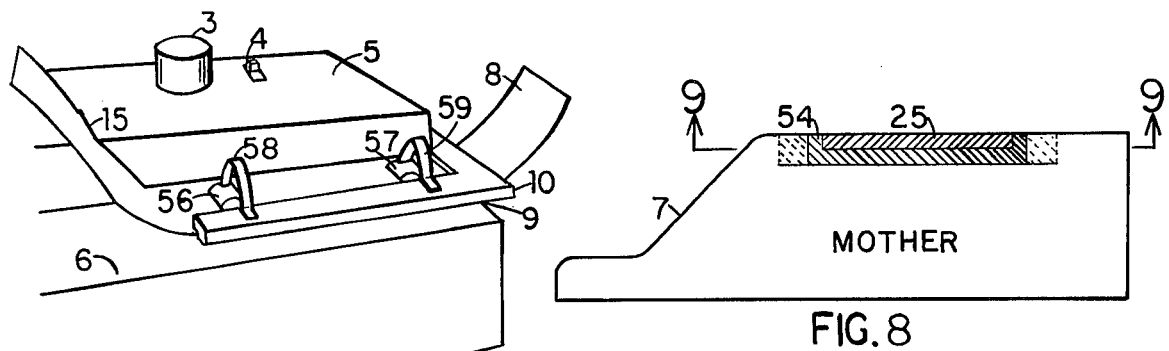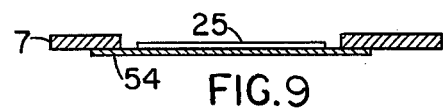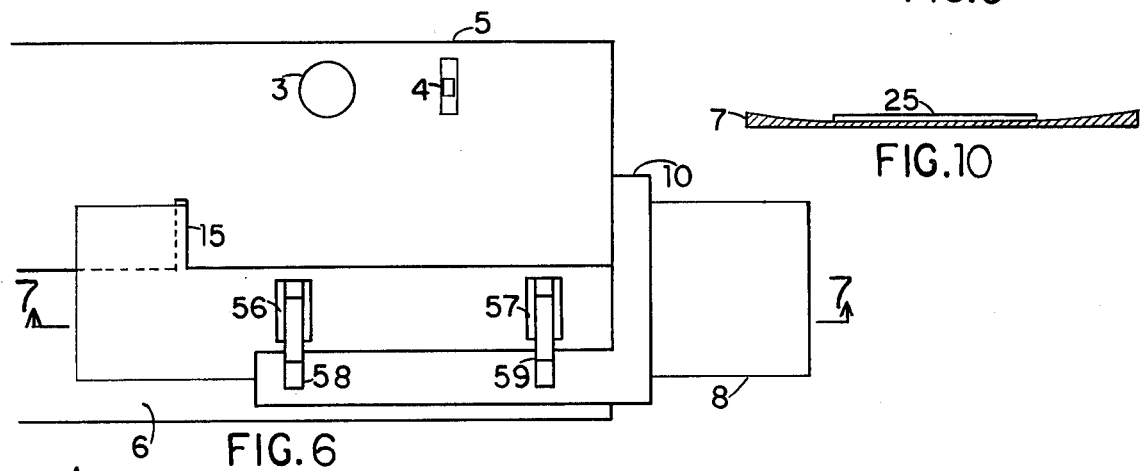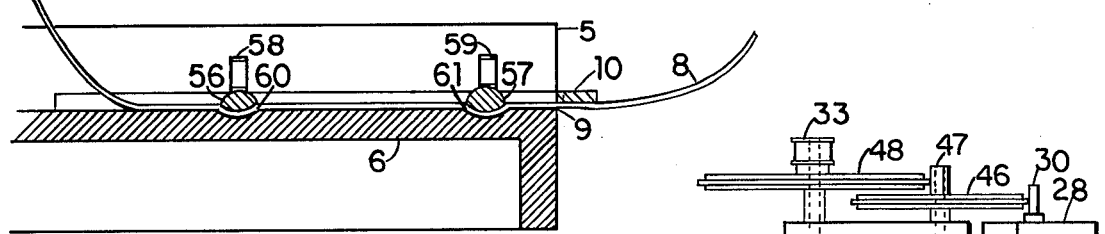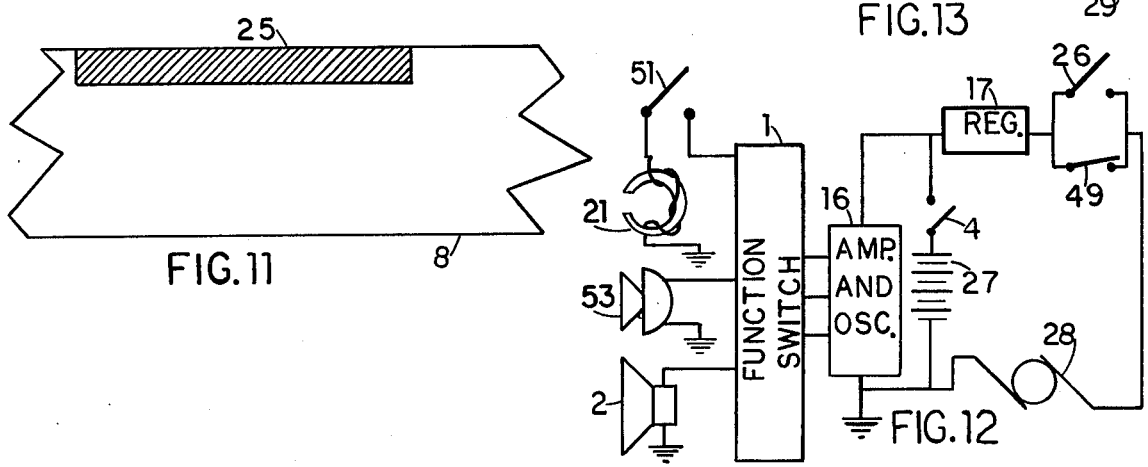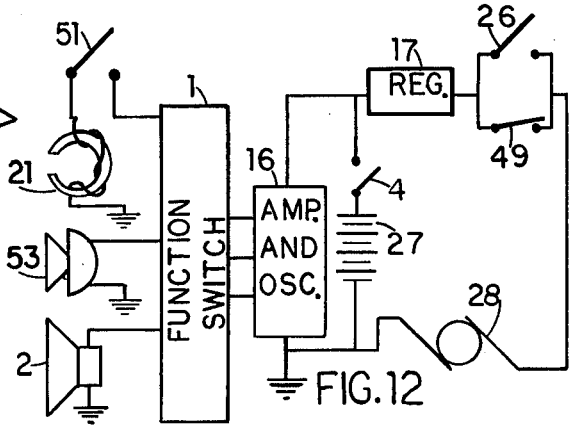

RECORD-REPRODUCE DEVICE FOR FLASH CARDS

SUMMARY OF THE INVENTION

This invention relates to tape recording and reproducing apparatus of a kind in which magnetic tape is affixed to removable-insertable cards in the preferred embodiment and flexible tape in a second embodiment. Prior art has consisted of devices in which insertable cards move through the machine as the message is recorded or reproduced; such action does not permit simultaneous sight, touch and hearing perception, a requisite essential to easy and proper learning. U.S. Pat. No. 3,488,867 does recognize this problem and solves it in a way that defeats the intent of the present invention. The present invention reduces complexity and parts count to the extent that the device will reach the home market at justifiable cost. In such devices of this kind, the message time is quite short and so it is vital to make maximum utilization of the wavelength "reading" capability of present magnetic heads. In prior art there exists an unavoidable increase in effective gap between the magnetic head and tape. As such a gap increases, the head becomes less and less capable of "reading" the shorter recorded wavelengths on the tape. Hence head speed must be increased to provide the maximum frequencies required for intelligible speech and so message time is reduced for a given card size. To make maximum use of the head's ability to read short wavelengths there must exist a "wrapping" of the tape about the head. In prior art, flat cards have been used with conventional rounded magnetic heads, which is what has caused the increase in effective gap. Making a flat head to conform to a flat card is no solution, since it is virtually and practically impossible to obtain the required intimate contact between two slideable planes, one of which is relatively nonrigid. The solution is to so place the head over the magnetic tape that it depresses the tape into a resilient undersupport. The magnetic tape then wraps itself partially about the head as it passes over the tape, thereby providing for maximum utilization of head "reading" ability. The magnetic tape may be placed on highly flexible material such as paper and the material attached to and supported by a relatively stiff card, in order to provide the required longitudinal tension. The flexible material is free to flex because it is in the notched out portion of the card. The combination of stiffness and flexibility may also be provided in an integrally constructed card in which the relatively stiff card material is thinned down sufficiently to provide the requisite flexibility and the magnetic tape placed on that flexible portion. In the embodiment using flexible tape, longitudinal tension is provided by the device, having pressure fingers and corresponding transverse depressions in the support deck. Any long strip of flexible material may be used; paper calculator tape, an easily available material, would be a typical choice.

Such a device is desirable and useful. Blind people remote from institutions may teach themselves braille. Children at home may teach themselves to read while "playing." Students of language will find a unique way to learn vocabulary through the use of word pairing cards. Such uniqueness acts as an aid to memory and also provides proper pronunciation not available from books. Constructive game cards can also be used in the machine with questions on the face and answers in audio.

A principal object of this invention is to provide a flash card audible reader which will enable a blind person to teach himself braille.

A further object of this invention is to provide a flash card audible reader which fully utilizes the recorded wavelength "reading" capability of present magnetic heads.

A further object of this invention is to provide an audible reader capable of reading cards with magnetic tape affixed and which remain stationary while the message is read.

A further object of this invention is to provide an audible reader capable of reading flexible tape with magnetic tape affixed and which remains stationary while the message is read.

A further object of this invention is to so reduce complexity and number of parts over prior art that the device will price out suitable for the home market.

The foregoing and other objects are realized in the present invention by a device having magnetic head drive means and switching means provided to start and stop action, as well as to prevent audible output during the head return part of the cycle. Magnetic tape wrap means are provided to ensure maximum magnetic head wavelength "reading" capability. A better understanding can be had from the following description and the accompanying drawings (any obvious fastening devices have been omitted to enhance clarity).

FIG. 5 is a perspective of the right side, showing use of flexible tape, in a second embodiment;

FIG. 6 is a top plan view of FIG. 5;

FIG. 7 is a section at 7—7 in FIG. 6; flexible material thickness is exaggerated for clarity;

FIG. 8 is a top view of a flash card;

FIG. 9 is a section at 9—9 in FIG. 8;

FIG. 10 is a similar section to FIG. 9, except for the integrally constructed flash card;

FIG. 11 is a top view of flexible tape, showing magnetic tape affixed;

FIG. 12 is a functional wiring diagram of essential components; and

FIG. 13 shows compound wheel speed reduction.

Figure 1:
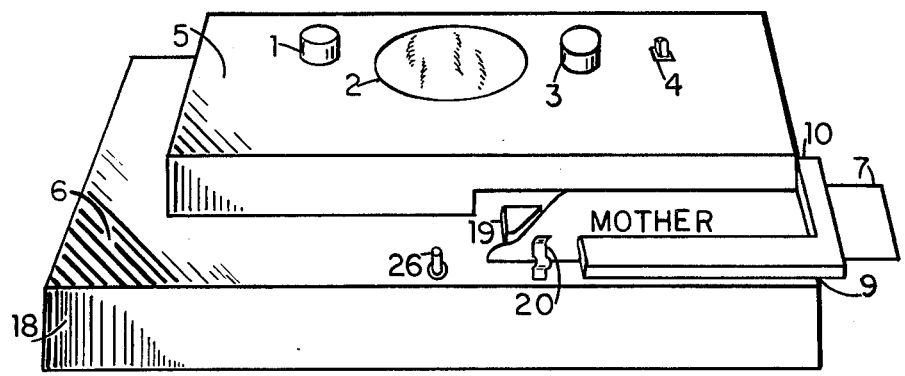
FIG. 1 is a perspective view of the preferred embodiment of the device, with a flash card inserted.
Figure 2:
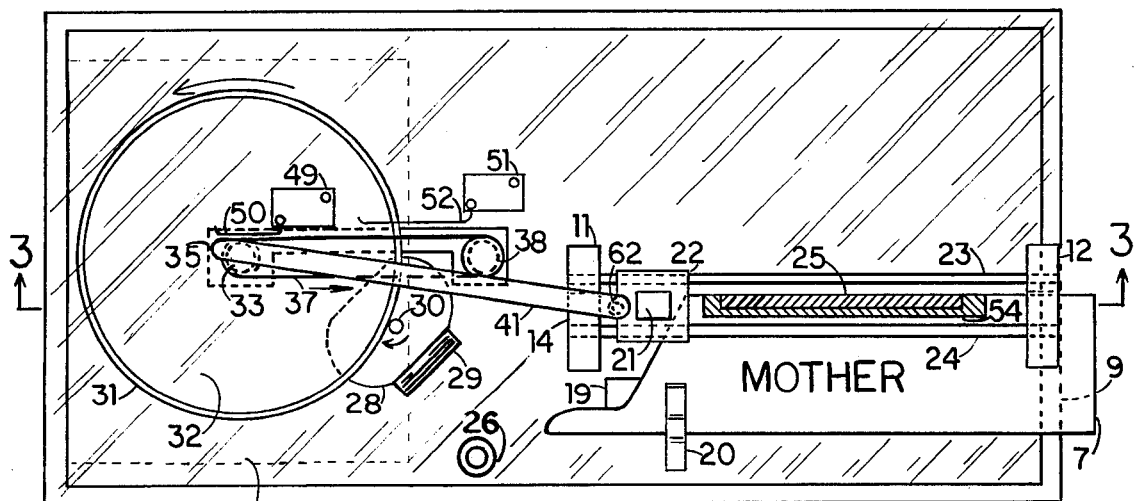
FIG. 2 is a top view with cover 5 removed. Deck 6 is transparent here to allow a view of normally concealed parts; guide 10 is removed.

FIG. 1 shows the preferred embodiment of the assembled instrument using a flash card 7 (detailed in FIG. 8). Essentially the same machine, in a second embodiment, is adaptable for use with flexible tape, as shown in FIGS. 5 and 6. Referring to FIG. 1, the device contains a function switch 1 which changes function from record to reproduce mode. In the same FIGS. 1, 2 is a speaker, 3 is a volume control and 4 is the on-off switch. Flash card 7 or flexible tape 8 (FIG. 11) is inserted in a slot 9, formed between quide 10 and deck 6. Rod supports 11 and 12 (FIG. 2) are cantilevered to allow continuation of the slot, and such appear as gaps 13 and 14 in FIG. 3. In the second embodiment, an emergence slot 15 (shown in FIGS. 5, 6 and 7) allows emergence of flexible tape. Cover 5 contains amplifier and oscillator (Box 16), voltage regulator 17 (FIG. 12) and physically supports items 1, 2, 3 and 4. Rectangular skirt 18 supports deck 6. Guide stop 19 aligns flash cards and stops same for proper positioning. Spring-holder 20 (FIG. 2), fashioned typically from material such as phosphor bronze, holds cards stationary, preventing card motion as the magnetic head sweeps over the affixed magnetic tape.

HEAD DRIVE MEANS

A record-reproduce magnetic head 21 is mounted in head bracket 22, slideable longitudinally on parallel rods 23 and 24. Said rods are also parallel to magnetic tape 25 affixed to flash cards and flexible tape, which are held in a horizontal position. Rods 23 and 24 are supported by rod supports 11 and 12 in such position as to place the magnetic head in alignment longitudinally with the magnetic tape. The motion of the head is such that it traverses the entire length of magnetic tape in a uniform motion. In operation (after closing on-off switch 4), normally open momentary switch 26 is depressed manually, closing the circuit from power source 27 (FIG. 12) through voltage regulator 17 (FIG. 12) to motor 28. Motor mount 29 is made of spring material such as phosphor bronze and acts to press motor shaft 30 against wheel edge 31. Wheel edge 31 is fabricated from a material such as hard rubber, which has a relatively high coefficient of friction. Motor shaft 30 is essentially parallel to axis of wheel 32. The normal force between motor shaft and wheel edge, so generated by the motor mount, is sufficient to prevent slippage between motor shaft and wheel edge during operation. As viewed from the top, motor shaft 30 turns clockwise against wheel edge, causing wheel edge to move in the direction shown by the arrow, hence imparting a counter-clockwise rotation to wheel 32. Axially attached to wheel 32 is wheel pulley 33 and bearing boss 34 allows the wheel to clear shaft support 35. Wheel shaft 36 is fixed in shaft support 35. An axial hole in wheel and wheel pulley allows free rotation about wheel shaft 36. An endless belt 37 girds wheel pulley 33 and idler pulley 38. Idler pulley 38 is mounted similarly to wheel pulley 33 and rotates freely about idler shaft 39, which is also fixed in shaft support 35. Attached to belt 37 is a socket 40 (FIG. 2); both belt and socket move in the direction of the arrow. A connecting rod 41 has at its ends identical pins 42 and 43, and pin bosses 44 and 45; one end is better shown in FIG. 4. At the socket end of the connecting rod, the pin 42, inserted in socket 40, allows rotational freedom of the connecting rod in a plane parallel to the magnetic tape. The boss 44 at that end is equal in diameter to the socket and thus maintains proper elevation of that end of the rod. At the head bracket 22 end of the rod, pin 43 is inserted in a hole 62, in head bracket 22. Pin 43 allows rotational freedom of the rod, in a plane parallel to the magnetic tape. The boss 45 maintains the head bracket end of the rod at proper elevation. As the socket travels in the direction shown by the arrow, connecting rod 41 pushes head bracket 22 towards the right, carrying head 21 and making a pass over magnetic tape 25. When socket 40 rounds idler pulley 38, it starts its return trip, carrying connecting rod 41 back to the start position. Since the bosses 44 and 45 maintain the rod at proper elevation, the rod is free to pass over the belt and pulleys, as it follows the motion of the socket. Since the rotation of the wheel is at constant speed, travel of the socket between axis of the pulleys is uniform. The motor speed (and hence wheel speed) is constant because its input voltage is constant (held so by action of voltage regulator 17) and because the mechanical load is light (relative to motor load capability) and constant over the magnetic tape portion of travel. The ratio of outside diameter of wheel 32 (i.e. including wheel edge 31) to the diameter of motor shaft 30, determines the proper rotational speed reduction, as well as torque increase. The preferred embodiment shows only a single relatively large wheel, as it represents the most economical method. Single wheel reduction is not quite as compact as compound wheel reduction and since compactness may be desirable, at a slight increase in cost, the option should be included.

Figure 3:
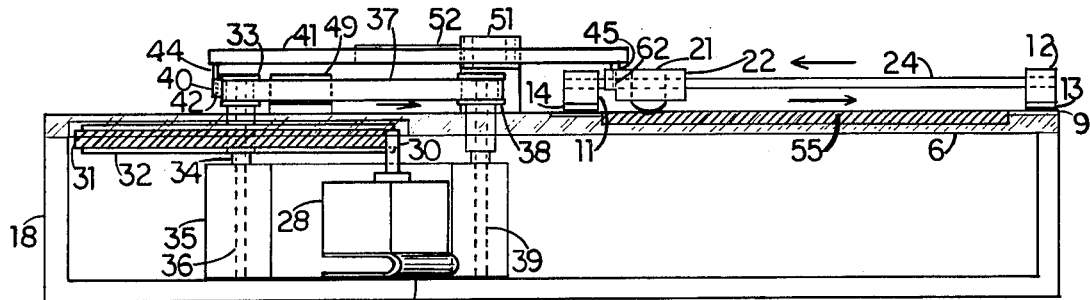
FIG. 3 is a cross-section through the device, taken substantially on the line 3—3 in FIG. 2; flash card removed.

In FIG. 13 motor shaft 30 bears against the edge of a relatively small first wheel 46, in the same manner as shown in FIG. 3, wherein it bears against a large wheel 32. Shaft 47 axially fixed to first wheel 46 bears against edge of a second wheel 48 which carries axially affixed wheel pulley 33. The fixed axis positions of wheels 46 and 48, in combination with the resilience of the edge of wheel 48, provide the required normal force for slip-free operation. In this second embodiment, wheel pulley 33 occupies precisely the same position it does in FIGS. 2 and 3 in the preferred embodiment. Motor shaft 30, however, must now rotate in the opposite direction to that shown in FIG. 2, namely, counter-clockwise, in order to achieve the same belt motion as depicted in FIG. 2. Speed reduction now is the product of the two ratios of wheel to shaft diameters. Such two ratios are the outside diameter (i.e. including the wheel edge) of wheel 46 relative to shaft diameter 30 and the outside diameter of wheel 48 relative to shaft diameter 47.

SWITCHING MEANS

Switch 49 (FIGS. 2 and 12) is a normally closed switch; its actuating arm 50 is in position to be moved by socket 40 when socket 40 completes a cycle. Cycle completion is at that position as depicted by the socket in FIG. 2. When actuating arm 50 is so moved (rearward), switch 49 contacts open. Since momentary switch 26 is normally open and in parallel electrically with switch 49, both switches are open when the socket is in the position shown in FIG. 2 and no motion occurs. Manually depressing momentary switch 26 closes the motor circuit. If the switch is held just long enough to allow socket 40 to move away from actuating arm 50, switch 49 then closes its contacts. Momentary switch 26 may then be released and the cycle continues until the socket again returns to the position shown in FIG. 2, causing the contacts of switch 49 to open. Switch 49 function is to control the motor, automatically stopping it at the end of a cycle and maintaining its operation during a cycle. A new cycle may then occur by again depressing momentary switch 26. Switch 51 is a normally closed switch. (FIG. 2, 12) Switch 51 is located in such position that its actuating arm 52 (FIGS. 2 and 12) strikes the left end of connecting rod 41. On the return travel of connecting rod 41 (when the head is traveling backwards), the rod end at the socket is displaced readward and only then does it move actuating arm 52, which opens the contacts of switch 51, thereby removing the magnetic head 21 from the circuit, thus preventing audible gibberish, which would result if the head were left in the circuit on its backward run over the tape.

Function switch 1 (FIGS. 1 and 12) determines whether the machine is in a record or a reproduce mode. In the record mode it connects microphone 53 to the input of the amplifier (in Box 16, FIG. 12). the magnetic head 21 to the output of the amplifier and a suitable amount of oscillator bias from the oscillator (also in Box 16, FIG. 12) to the head. In the reproduce position, switch 1 connects the magnetic head 21 to the input of the amplifier (Box 16) and the speaker 2 to the amplifier output. The oscillator bias is disconnected in this mode. Details of the switch 1 arrangement, as well as those of the amplifier, oscillator and voltage regulator are known art and constitute no part of the present invention.

MAGNETIC WRAP MEANS

FIG. 8 shows a typical flash card with magnetic tape 25 affixed lengthwise to flexible material 54, as shown in FIG. 8. Such flexible material is any suitable material having physical characteristics typically displayed by paper. Flash card 7 is notched out at the top, as shown in FIG. 8. The flexible material is attached to and supported by the card 7. Such is accomplished by having said material placed on the under side of the card and of such dimension as to extend beyond the notch (as shown by dashed lines in FIG. 8 and in sectional view, FIG. 9). The material is affixed at such extension to the card. Such fixation is not critical and may be accomplished as shown, at the ends of the notch or on all three edges of the notch. The flexible material may also attach only at the ends of the magnetic tape, as shown by 54, in FIG. 4. The flexible material is then free in the space provided by the notch.

FIG. 10 shows a similar section of a flash card, made by an integral process. In this case, the flash card 7 is thinned down in crossection, in an area equivalent to that of the notch in FIG. 8. It is thinned down to the extent that it is as flexible as the material used in FIG. 8. Magnetic tape is affixed lengthwise to this thinned down portion and is free to flex; such construction is functionally identical to the structure shown in FIG. 8.

Figure 4:
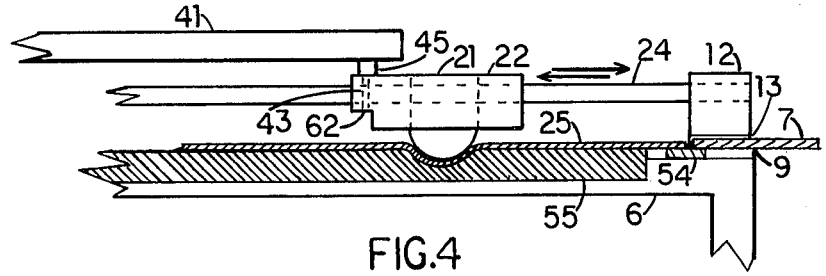
FIG. 4 is an enlarged fragment corresponding to the right portion of FIG. 3; flash card in place.

A card is inserted in the device, such that it is guided first by guide 10 and finally stopped by guide stop 19. These two guide devices place the card in alignment with the proper path of the magnetic head and over resilient undersupport 55 (FIGS. 3 and 4). Rod supports 11 and 12 place the head bracket 22 and head 21 just high enough over the tape 25, such that the head 21 depresses the tape into the resilient undersupport 55, causing the tape to partially wrap about the head as it moves over the tape, as shown in FIG. 4.

For sighted children (and possibly for the unsighted) flexible tape may prove to be a more economical insertable-removable means and so in a second embodiment, the device can be adapted to its use. In such embodiment, guide stop 19 and spring-holder 20 are not needed, and spring-loaded pressure fingers 56 and 57, with their attached springs 58 and 59 (typically made of phosphor bronze), are attached to guide 10. The springs (attached to said pressure fingers) hold the pressure fingers down with force, into corresponding transverse depressions 60 and 61 (FIG. 7) in deck 6. Flexible tape 8 is threaded into the machine under guide 10, over deck 6, under pressure fingers 56 and 57 and then cut through emergence slot 15, in cover 5. Note rods 23 and 24 are set forward so that the flexible tape emerges through emergence slot 15, in front of connecting rod 41. Pressure fingers 56 and 57 serve to apply the required longitudinal tension to the flexible tape, as well as to hold it in place as the head sweeps over the magnetic tape. Flexible tape 8 may be any convenient length and may have braille letters, braille words, printed matter and pictures, singly or in any combination, on its face.

The preferred embodiment FIG. 1 contains no emergence slot 15, pressure fingers 56 and 57 (with their springs 58 and 59) or transverse depressions 60 and 61. Such a construction is useful with flash cards only.

The second embodiment (alluded to above, where functional details were most pertinent, but omitting the following structural details), combines both functions of flash card and flexible tape reader, in one device. In this embodiment, there is a basic structure which always contains an emergence slot 15, guide 10 and transverse depressions 60 and 61. To make this structure useful both ways, guide stop 19, spring-holder 20 and pressure fingers 56 and 57 (with their springs 58 and 59) are made removable. A first assembled order would add to the basic structure, a removable guide stop 19 and removable spring-holder 20: such assembled order would adapt the device to the use of flash cards. A second assembled order would add to the basic structure, removable pressure fingers 56 and 57 (with their springs 58 and 59). Such assembled order would adapt the device to the use of flexible tape. Either or both of the above embodiments may be structured with either the single wheel speed reduction or the compound wheel speed reduction. The two methods of speed reduction in no way alter the basic function or operation of the machine as already described; such two methods offer a trade off between compactness and economy.

It is to be understood in the claims to follow, that the novelty presented so far in the specification is the great reduction in parts required to obtain head motion, as well as magnetic tape wrap means, which allow maximum magnetic head wavelength "reading" capability and hence maximum message time for given card or flexible tape length. The specific embodiments, herein disclosed, are for the purpose of illustrating the above mentioned points, and should not be considered restrictive. Minor variations, which still come within the intent and equivalency of the appended claims, are intended to be embraced therein.

What I claim is:

1. A recording-reproducing device for flash cards, utilizing a magnetic head, driven reciprocally on rods over magnetic tape, which is affixed to insertable-removable stationary cards, all of which are conventional and known, wherein the improvement comprises; a recording-reproducing device utilizing magnetic tape, affixed to insertable-removable means, which remain stationary during record and reproduce operation; the combination of a record-reproduce magnetic head, in bracket mounted slideably on parallel rods, said rods being also set parallel to, above and in alignment with the magnetic tape on insertable-removable means; guide, guide-stop and spring-holder, guide and allow entrance of insertable means to proper position in the device, and maintain such position; mechanical drive means to provide uniform head motion reciprocally on said rods, consists of a connecting rod, pinned at one end to the magnetic head bracket, said pin allowing rotational freedom of said connecting rod in a plane parallel to the plane of the magnetic tape; said connecting rod pinned at its other end in a socket affixed to a movable, endless belt, said other pin allowing rotational freedom of the rod in same plane as above mentioned; said movable, endless belt girds two pulleys, one an idler pulley, free rotationally on its axis; the other wheel pulley is attached axially coincident to a wheel, edged with relatively frictonal material, said wheel being free to rotate on its axis; a spring-mounted motor, bearing its shaft with sufficient normal force against the wheel edge, said motor shaft being essentially parallel to the axis of the wheel, imparts rotational motion to said wheel; switch means with attached actuating arm, in position to come in contact with the socket on belt, said switch means thus acting to control the motor; a momentary switch electrically in parallel with above switch means, which when manually depressed, starts said motor, a third switch with actuating arm attached, positioned to come in contact with connecting rod on its return run, serves to disconnect said head from circuit; a resilient undersupport, mounted in position to correspond to magnetic tape on inserted, insertable-removable means, said insertable-removable means flexibly holding the magnetic tape; means to provide proper longitudinal tension to magnetic tape and said rods positioned at such height above magnetic tape, as to have magnetic head depress magnetic tape into resilient undersupport, as it passes over the magnetic tape.

2. The combination in record-reproduce device, as in claim 1, consisting of a basic structure, containing an emergence slot, guide and transverse depressions; a first assembled order, in which are added a removable guide stop and spring-holder, to adapt the device to the use of flash cards; a second assembled order, in which spring-loaded pressure fingers are added to adapt the device to use of flexible tape.

3. The combination in recording-reproducing device, as in claim 1, in which said shaft of spring-mounted motor bears against the edge of a first wheel, a shaft, axially affixed to the first wheel against the edge of a second wheel, a wheel pulley axially affixed to the second wheel is functionally identical to said wheel pulley in claim 1.

4. The combination in recording-reproducing device as in claim 1, in which said insertable-removable means is a relatively stiff card, notched longitudinally at its top; a relatively flexible material attached to and supported by said card, the free part of which occupies the space made available by said notch, such free bears affixed magnetic tape; the face of said card bearing singly or in any combination, braille letters, braille words, printed matter and pictures.

5. The combination in recording-reproducing device as in claim 1, in which said insertable-removable means is a relatively stiff card, thinned out sufficiently in a longitudinal section at its top, wherein it becomes relatively flexible in such thinned area; the thinned area having affixed to it magnetic tape; said card bearing on its face, singly or in any combination, braille letters, braille words, printed matter and pictures.

6. The combination in recording-reproducing device as in claim 1, in which said insertable-removable means is a strip of flexible material bearing on its surface magnetic tape, and singly or in any combination, braille letters, braille words, printed matter and pictures.

7. The combination in recording-reproducing device as in claim 1, a structure including a resilient undersupport, positioned in alignment with magnetic tape flexibly held; said magnetic tape is in such relative position to a moving magnetic head, as to be depressed into said resilient undersuppport and partially wrap about the moving magnetic head as the head passes over the tape.

* * * * *

UNITED STATES PATENT OFFICE
CERTIFICATE OF CORRECTION

Patent No. 4,027,405  Dated June 7, 1977

Inventor(s) Alden Schloss

It is certified that error appears in the above-identified patent and that said Letters Patent are hereby corrected as shown below:

Column 8, line 13, "such free bears" should read

-- such free part bears --.

Signed and Sealed this

*Eighteenth* Day of *October 1977*

[SEAL]

Attest:

RUTH C. MASON
*Attesting Officer*

LUTRELLE F. PARKER
*Acting Commissioner of Patents and Trademarks*